United States Patent
Dai et al.

(10) Patent No.: US 7,758,982 B2
(45) Date of Patent: Jul. 20, 2010

(54) SIN OVERCOAT FOR PERPENDICULAR MAGNETIC RECORDING MEDIA

(75) Inventors: Qing Dai, San Jose, CA (US); Hoa Van Do, Fremont, CA (US); Min Xiao, San Jose, CA (US); Bing K Yen, Cupertino, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 947 days.

(21) Appl. No.: 11/218,702

(22) Filed: Sep. 2, 2005

(65) Prior Publication Data

US 2007/0054153 A1   Mar. 8, 2007

(51) Int. Cl.
  *G11B 5/716* (2006.01)
(52) U.S. Cl. .................................. 428/834; 428/800
(58) Field of Classification Search .................. None
  See application file for complete search history.

(56) References Cited

U.S. PATENT DOCUMENTS

| | | | |
|---|---|---|---|
| 3,755,123 A | 8/1973 | Davidse et al. | 204/192 |
| 4,036,723 A | 7/1977 | Schwartz et al. | 204/192 |
| 4,701,374 A * | 10/1987 | Sagoi et al. | 428/336 |
| 4,748,073 A * | 5/1988 | Sagoi et al. | 428/213 |
| 5,425,988 A * | 6/1995 | Ogawa et al. | 428/333 |
| 5,641,611 A | 6/1997 | Shieh et al. | 438/35 |
| 5,660,700 A | 8/1997 | Shimizu et al. | 204/298.08 |
| 5,693,197 A | 12/1997 | Lal et al. | 204/192.2 |
| 5,815,342 A | 9/1998 | Akiyama et al. | 360/97.01 |
| 5,993,613 A | 11/1999 | Manley | 204/192.12 |
| 6,027,801 A * | 2/2000 | Maro et al. | 428/332 |
| 6,051,114 A | 4/2000 | Yao et al. | 204/192.3 |
| 6,086,730 A | 7/2000 | Liu et al. | 204/192.16 |
| 6,110,328 A | 8/2000 | Shimizu et al. | 204/192.12 |
| 6,136,421 A * | 10/2000 | Chen | 428/216 |
| 6,290,821 B1 | 9/2001 | McLeod | 204/192.12 |
| 6,313,905 B1 | 11/2001 | Brugger et al. | 355/55 |
| 6,468,403 B1 | 10/2002 | Shimizu et al. | 204/192.29 |
| 6,551,471 B1 | 4/2003 | Yamaguchi et al. | 204/192.12 |
| 2004/0231972 A1 | 11/2004 | Laptev et al. | 204/192.12 |

FOREIGN PATENT DOCUMENTS

| | | |
|---|---|---|
| EP | 0 230 953 A2 | 8/1987 |
| JP | 11120631 | 4/1999 |
| JP | 11167752 | 6/1999 |
| JP | 2003317333 | 11/2003 |

* cited by examiner

*Primary Examiner*—Mark Ruthkosky
*Assistant Examiner*—Gary D Harris
(74) *Attorney, Agent, or Firm*—Zilka-Kotab, PC

(57) ABSTRACT

A SiON overcoat for use on magnetic media for magnetic recording. The SiON overcoat is deposited by pulsed DC sputtering while applying a negative DC bias. The SiON overcoat is especially useful on perpendicular magnetic recording media because of its ability to deposit thinly and evenly on a rough, granular high coercivity recording media while maintaining excellent corrosion protection properties. A SiON overcoat can be applied less than 3 nm thick while still maintaining excellent mechanical and corrosion protection. The overcoat also has a very high density and water contact angle.

11 Claims, 4 Drawing Sheets

SIN OVERCOAT FOR PERPENDICULAR MAGNETIC RECORDING MEDIA

FIELD OF THE INVENTION

The present invention relates to magnetic data recording, and more particularly to an overcoat for use on a magnetic media. The overcoat is particularly suited for use on perpendicular magnetic recording media.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

The demand for ever increasing data rate and data density has led a push to develop perpendicular magnetic recording systems. Whereas more traditional longitudinal recording systems record data bits as magnetic transitions oriented longitudinally on a magnetic medium, a perpendicular recording system records data as magnetic bits oriented perpendicular to the plane of the medium. Such perpendicular recording systems require new high coercivity mediums in order to perform at their maximum potential. Perpendicular magnetic recording media include a thin high coercivity top layer formed over a low coercivity underlayer.

Suitable materials for use in the high coercivity top layer of the media are both highly corrosive and porous. In order to prevent corrosion of this high coercivity top layer, and also to allow the slider to fly over the media, a thin protective overcoat must be applied. Currently diamond like carbon (DLC) is used for this top coat, and has been considered the best material available for this purpose.

Unfortunately, higher coercivity media, and higher data rate recording systems are becoming increasingly incompatible with the use of such DLC overcoats. For example, the high coercivity media materials needed for perpendicular recording are very granular and rough. The currently available DLC overcoats, deposited by ion beam deposition are too directional and tend to preferentially deposit on the peaks of the rough granular surface of the media. In order to ensure complete coverage, the DLC coating must be deposited at least 4 or 5 nm thick. To make matters worse, future perpendicular media, with well segregated grains will be even harder to cover. The deposited DLC, when deposited on such materials does not spread well, making it very difficult to achieve a uniformly coated surface.

What is needed is a material that can provide adequate corrosion and mechanical protection at a thickness less than 3 nm. Such a material would preferably be easily applied, being capable of spreading evenly to uniformly coat a surface of the media. Such a material would also preferably incur little or no additional expense or manufacturing complexity.

SUMMARY OF THE INVENTION

The present invention provides an exceptional overcoat for use on a magnetic recording media. The invention includes a $SiO_xN_y$ overcoat formed over a magnetic layer of a magnetic recording media, where x may be from 0.8 to 1.2, and Y may be from 0.8-0.9

The SiON overcoat can be deposited on the magnetic media by employing a pulsed DC power source to strike a plasma in a sputter deposition chamber having a nitrogen atmosphere. The SiN can be deposited on a magnetic media on a substrate held on a chuck while applying a negative DC bias voltage. The negative DC bias voltage increases the density of the SiN overcoat and also allows the SiN to be deposited evenly on a rough magnetic surface, thereby allowing a much thinner overcoat to be applied.

The SiN overcoat, applied using a pulsed DC power source on a biased chuck, has an advantageous high water contact angle of greater than 100 degrees, which prevents surface contamination and corrosion during use of the media. This is much higher than the water contact angle of a SiN overcoat applied without a pulsed DC power source and without biasing.

The SiN overcoat can also advantageously be deposited very thin, less than 3 nm and even about 2.5 nm, while still maintaining excellent corrosion protection. This reduced thickness of the overcoat decreases magnetic spacing, allowing for increased data rate and data capacity. The SiN overcoat also provides many orders of magnitude improvement in corrosion protection as compared with prior art carbon based overcoats, even while being applied thinner than such prior art overcoats.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
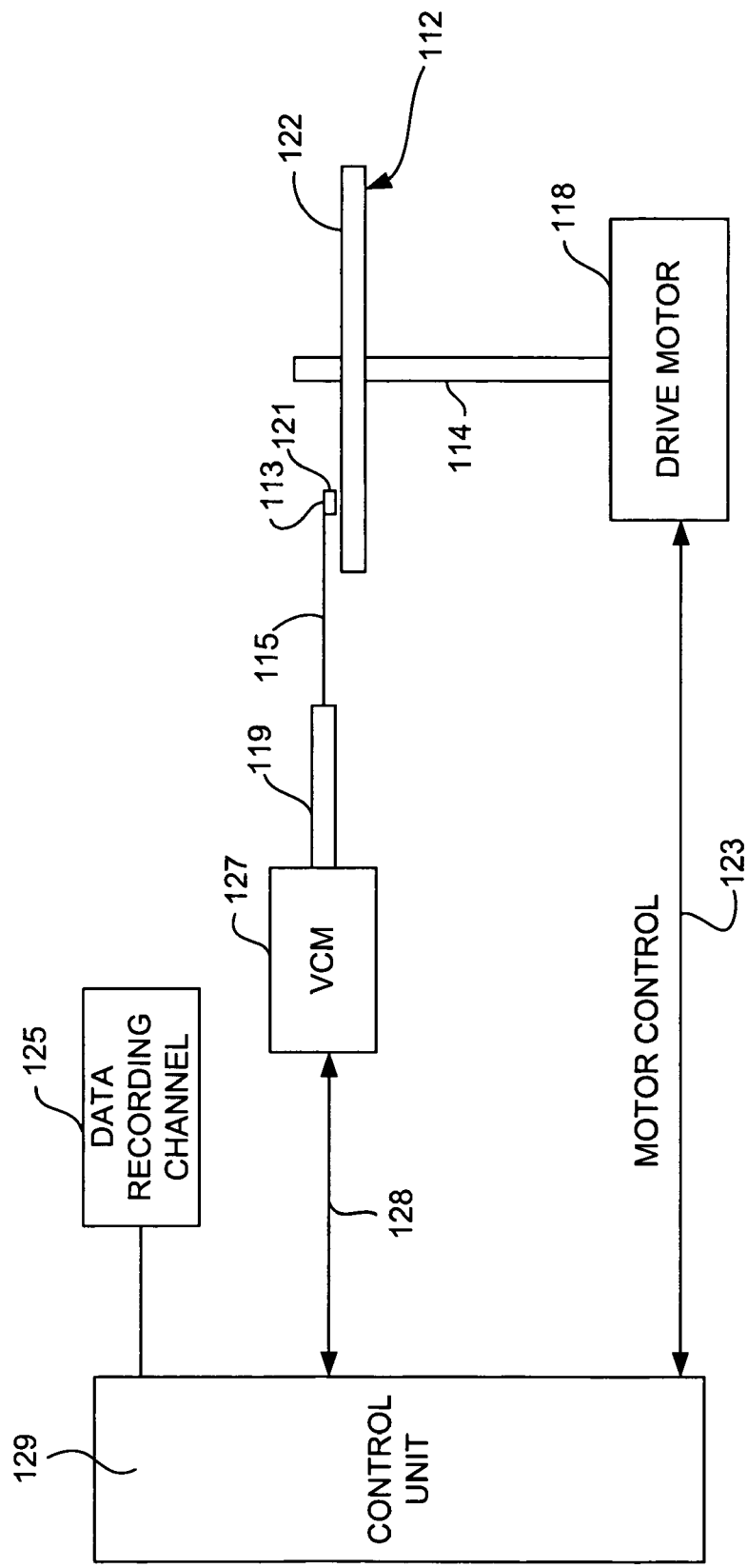
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
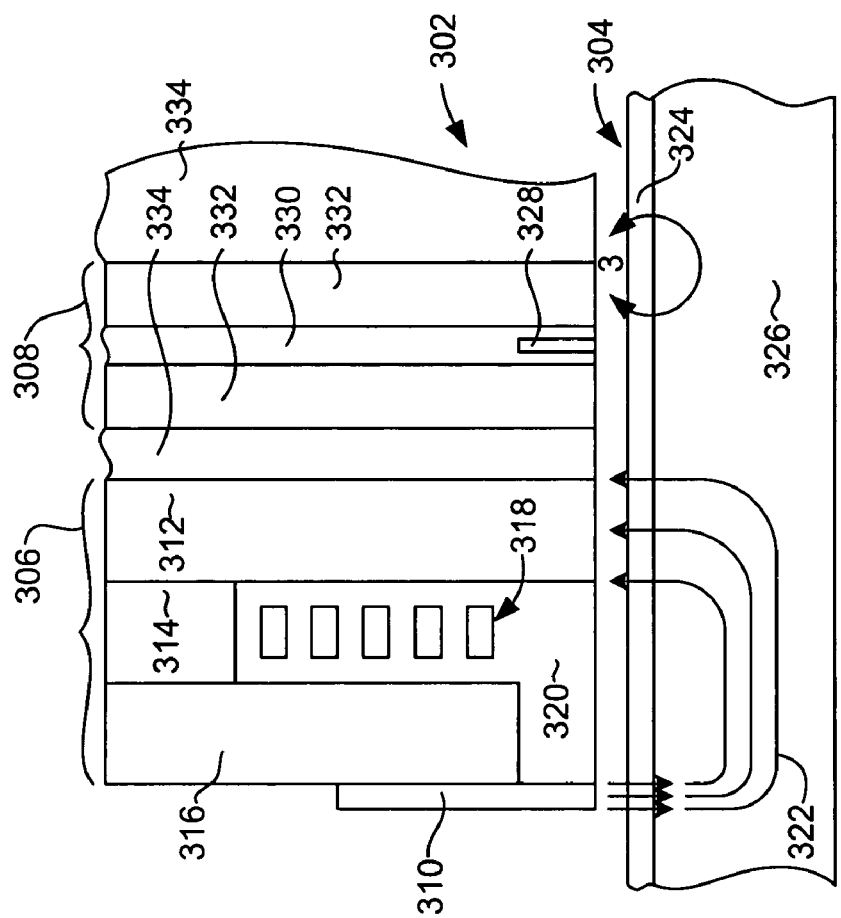
FIG. 2 is cross sectional schematic view illustrating a perpendicular magnetic recording system in which the present invention might be embodied.

With reference now to FIG. 2, a perpendicular magnetic head 302, and a magnetic media 304 for use in the present invention are described. The magnetic head 302 includes an inductive write head 306 and a read head 308. The write head includes a magnetic write pole 310 and a return pole 312 having a much larger cross section. The write pole 310 and return pole 312 are magnetically connected by a magnetic back gap 314 and a shaping layer 316, both of which conduct magnetic flux from the return pole 312 to the write pole 310. An electrically conductive write coil 318 generates a magnetic field which causes a magnetic flux to flow through the return pole 312, back gap 314, shaping layer 316, and write pole 310. The write coil 318 is encased in an electrically insulating material 320.

The write pole 310 has a much smaller cross section than the return pole. A strong, dense write field 322 emits from the write pole in a direction that is substantially perpendicular to the surface of the medium 304. This write field is sufficiently strong that it can locally magnetize a portion of a high coercivity top layer 324 of the media 304. The write field then travels through a relatively low coercivity under-layer 326, where it passes back through high coercivity top layer 324 and back to the return pole 312. Since the return pole 312 has a much larger cross section than the write pole 310, the magnetic field 322 passing back to the return pole 310 is too weak to erase the bit recorded by the write pole.

The read head 306 includes a magnetoresistive sensor 328, which may be encased in a non-magnetic, electrically insulating gap material 330. The sensor 328 and gap material 330 may be sandwiched between first and second magnetic shields 332. An insulation layer 334 may separate the read head 308 from the write head 306 and may be provided on the other side of the read head as well.

Figure 3:
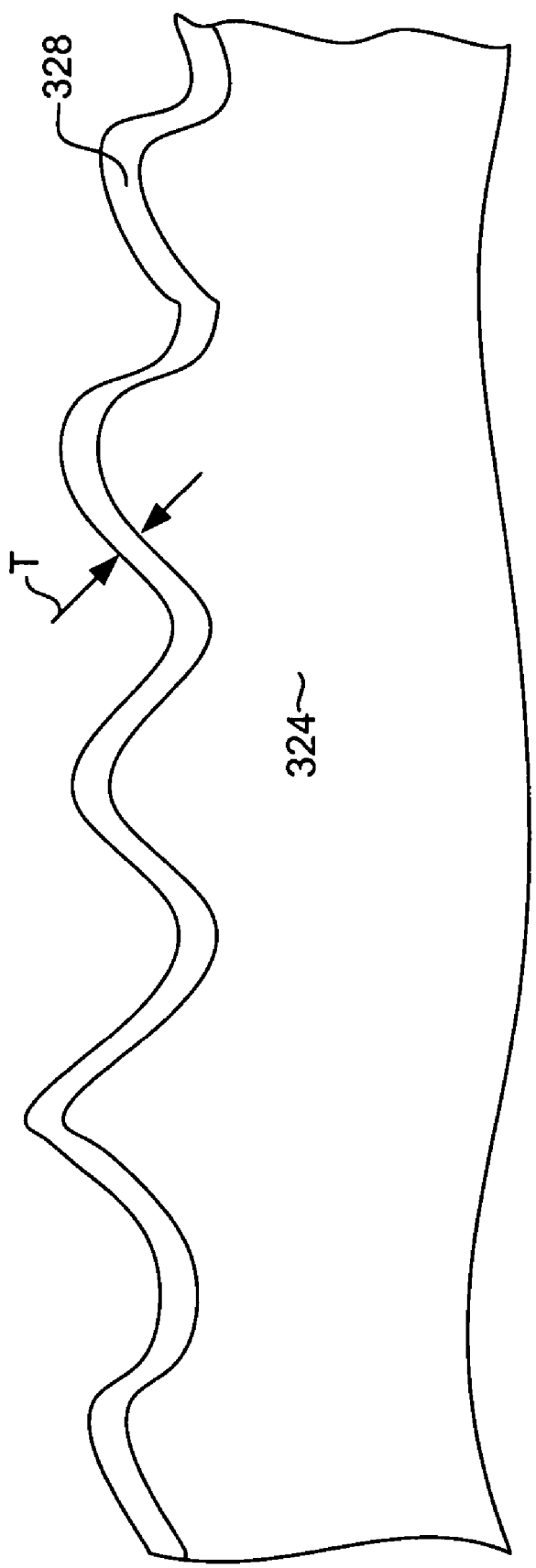
FIG. 3 is an enlarged sectional view of a portion of a magnetic media as taken from circle 3 of FIG. 2.

With reference now to FIG. 3, the top portion of the media 304 can be seen. This topmost portion includes the higher coercivity top layer 324 and an overcoat 328. The overcoat 328 is constructed of a specially deposited silicon nitride (SiON) which provides a dense, even, strong coating over the highly corrosive, high coercivity magnetic layer 324.

Figure 4:
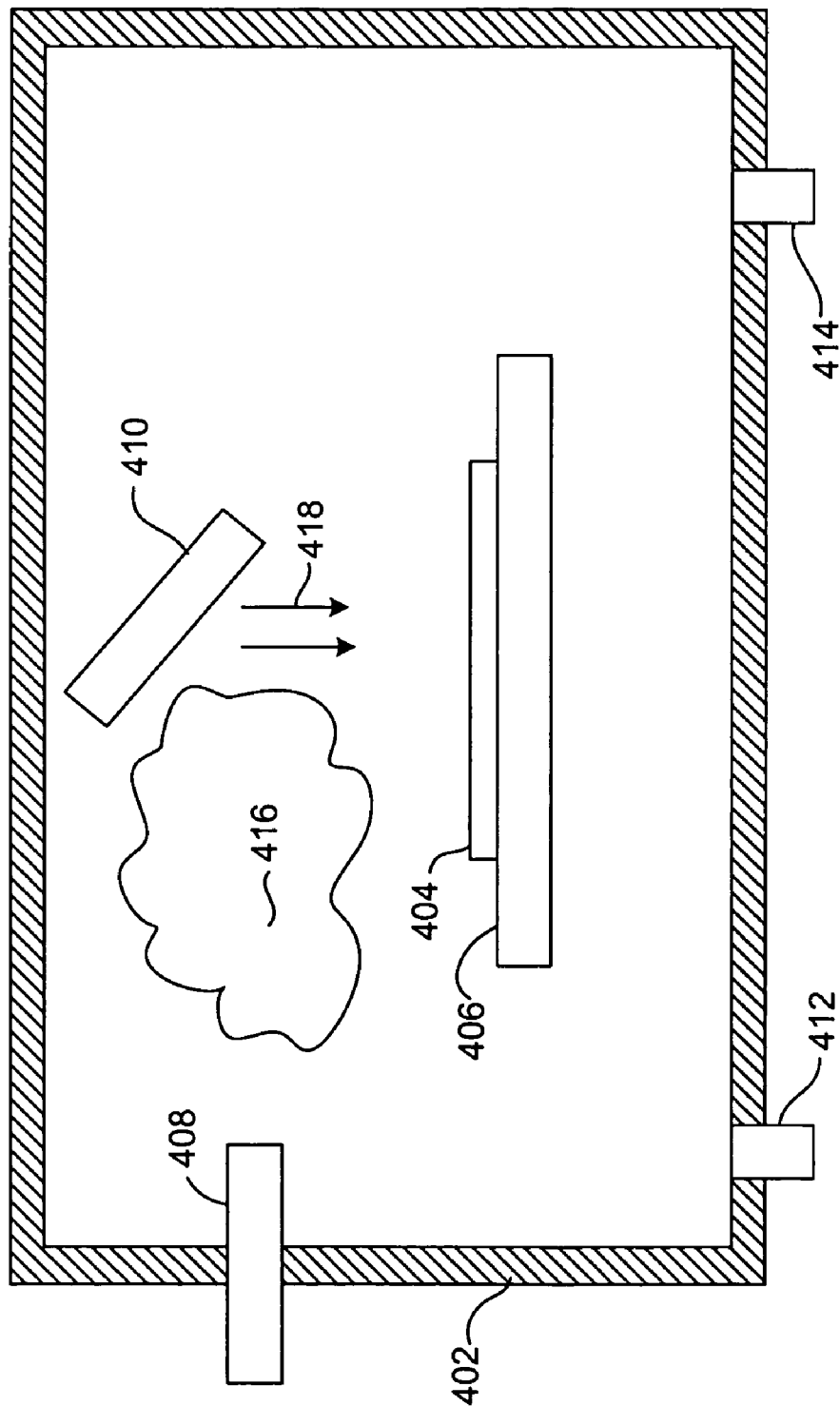
FIG. 4 is a schematic illustration of a sputter deposition chamber in which an overcoat according to an embodiment of the invention might be deposited.

With reference to FIG. 4, the overcoat 328 is deposited in a sputter deposition chamber 402. The overcoat is deposited on a substrate 404 that is held on a chuck 406. The chamber 402 also includes a pulsed DC power source 408, and a Si target 410. The chamber 402 also includes a gas inlet 412 and a gas outlet 414 which can be used to fill the chamber with an atmosphere that includes nitrogen ($N_2$). More preferably the atmosphere includes nitrogen ($N_2$) and Argon (Ar).

The DC pulsed power source 408 strikes a plasma 416 in the chamber 402, which dislodges Si atoms and ions 418 from the target 410. Si from the target 410 and N from the atmosphere react with one another in a reactive sputtering process and are deposited onto the substrate 404 as overcoat 328. A negative DC bias voltage is applied to the chuck. This bias voltage attracts the positively charge Si ions as well as positively charged N ions, resulting in a significantly higher density in the deposited SiON overcoat. This higher density provides greatly enhances corrosion protection as well as physical toughness of the overcoat 328.

The overcoat 328, deposited as described above has a concentration of SiOxNy. The process of sputter depositing SiN invariably results in a certain amount of oxygen (O) being present in the material, resulting in a material that can more accurately be described as (SiON). However, when SiN is sputter deposited without the pulsed, DC biased process described above the amount of oxygen is greatly increased. For example, sputter depositing SiN without the use of a DC pulsed power source and negative DC biased chuck results in a deposited material having a composition of SiOxNy, where x=1.4-1.6 and Y=0.7-0.9. Such a material has been described as ($Si_3O_4$). By contrast, the material deposited using a DC pulsed power source and negative DC biased chuck has a concentration of SiOxNy, where x=0.8-1.2 and y=0.8-0.9. This significantly decreased oxygen content advantageously results in a much denser structure.

The pulsed DC sputtered SiON overcoat 328 has excellent corrosion resistance even at thicknesses as small as 2-2.5 nm. The material has higher density than previously used overcoat materials. The SiON also spreads well, providing very uniform coverage even on rough (granular) media surfaces, and this coverage is further improved by the DC biasing. The DC bias causes the deposited SiON to flow evenly into the rough surface so that low spots or troughs in the surface are coated at substantially the same rate as surface peaks. This is not the case with the prior art carbon overcoats which tended to deposit much more readily at the peaks than in the valleys. This even deposition rate allows the SiON overcoat of the present invention to be deposited much thinner than prior art overcoats.

The above described material also has an improved water contact angle as compared with SiON applied without a pulsed DC power source and without negative biasing. As those skilled in the art will appreciate, water contact angle is a measure of the polar surface energy of the material, and is the ability of a material to cause water to bead rather than spread on its surface. A higher water contact angle means that the material will be much less prone to corrosion and surface contamination from the environment. The pulsed DC sputtered SiON overcoat 328 deposited with a negative DC bias on the chuck has a water contact angle well over a hundred degrees. This high water contact angle is comparable to ion beam deposited carbon overcoats, and means the SiON overcoat 328 has excellent corrosion and contamination resistance and is less susceptible to smearing.

The SiON overcoat 328 is much denser than the previously used carbon overcoats such as DLC and can be applied much thinner than these carbon based overcoats. As mentioned above, the overcoat 328 has a thickness less than 3 or 1-2.5 nm. More preferably, the overcoat has a thickness of 2-2.5 nm. Previously used carbon overcoats had to be deposited at least 4 nm thick to provide adequate protection. This ability to make the DC pulsed SiON overcoat 328 very thin allows for increased areal density by decreasing the magnetic spacing. Magnetic spacing is a very critical parameter in current and future recording systems.

To better appreciate the corrosion advantages of the SiON overcoat 328 over previous overcoats, experiments showed as an example, a sample of 45 Angstroms of DLC overcoat had a corrosion incidence of about 100 to 130 counts per surface after three days of exposure to a corrosive environment, and about 5000 to 10,000 counts per surface after exposure for 6 days. By contrast, a pulsed DC sputtered SiON overcoat, applied with a DC bias had zero (0) counts per surface at 3 days of exposure and only about 9 counts per surface after 6 days of exposure.

While various embodiments have been described above, it should be understood that they have been presented by way of example only, and not limitation. For instance, the media can include the media described in FIG. 2 as well as patterned media. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic media for use in a data recording system, the media comprising:
   a magnetic layer; and
   an overcoat formed over the magnetic layer, the overcoat consisting of $SiO_xN_y$, where x=0.8-1.2 and y=0.8-0.9;
   wherein the overcoat has water contact angle greater than 100 degrees.

2. A magnetic media as in claim 1 wherein the overcoat has a thickness less than 3 nm.

3. A magnetic media as in claim 1 wherein the overcoat has a thickness of 1-2.5 nm.

4. A magnetic media as in claim 1 wherein the overcoat has a thickness of 2-2.5 nm.

5. A magnetic media for use in perpendicular magnetic recording, comprising:
   a magnetic, low coercivity underlayer;
   a magnetic high coercivity top layer formed over the underlayer; and
   a non-magnetic overcoat formed over the high coercivity top layer, the overcoat consisting of $SiO_xN_y$, where x=0.8-1.2 and y=0.8-0.9;
   wherein the overcoat has water contact angle greater than 100 degrees.

6. A magnetic media as in claim 5 wherein the overcoat has a thickness less than 3 nm.

7. A magnetic media as in claim 5 wherein the overcoat has a thickness less than 3 nm.

8. A magnetic media as in claim 5 wherein the overcoat has a thickness of 1-2.5 nm.

9. A magnetic media as in claim 5 wherein the overcoat has a thickness of 2-2.5 nm.

10. A disk drive system comprising:

a housing;

a motor mounted within the housing;

a magnetic disk rotatably connected with the motor, the magnetic disk comprising a magnetic layer and an overcoat formed on the magnetic layer, the overcoat consisting of $SiO_xN_y$, where $x=0.8\text{-}1.2$ and $y=0.8\text{-}0.9$;

an actuator; and a slider connected with the actuator for movement adjacent to a surface of the magnetic disk, the slider including a magnetic write head and a magnetic read head;

wherein the overcoat has water contact angle greater than 100 degrees.

11. A disk drive as in claim 10 wherein the overcoat has a thickness less than 3 nm.

* * * * *